US009148180B2

(12) United States Patent
Wong et al.

(10) Patent No.: US 9,148,180 B2
(45) Date of Patent: Sep. 29, 2015

(54) COMMUNICATION DEVICE AND ANTENNA ELEMENT THEREIN

(71) Applicant: Acer Incorporated, New Taipei (TW)

(72) Inventors: Kin-Lu Wong, New Taipei (TW); Ya-Jyun Li, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 26 days.

(21) Appl. No.: 14/215,451

(22) Filed: Mar. 17, 2014

(65) Prior Publication Data

US 2015/0188581 A1 Jul. 2, 2015

(30) Foreign Application Priority Data

Dec. 26, 2013 (TW) ............................ 102148374 A

(51) Int. Cl.
*H04B 1/18* (2006.01)
*H04B 1/00* (2006.01)

(52) U.S. Cl.
CPC .................................... *H04B 1/006* (2013.01)

(58) Field of Classification Search
CPC ............ H01Q 9/04; H01Q 1/22; H01Q 1/24; H01Q 1/36; H01Q 23/00; H01Q 9/38; H01Q 1/2275
USPC ...................................................... 455/188.1
See application file for complete search history.

(56) References Cited

U.S. PATENT DOCUMENTS

| | | | | |
|---|---|---|---|---|
| 5,420,599 | A * | 5/1995 | Erkocevic | 343/828 |
| 7,215,290 | B2 * | 5/2007 | Cohen | 343/702 |
| 2009/0231229 | A1 * | 9/2009 | Phillips et al. | 343/843 |

* cited by examiner

*Primary Examiner* — Ajibola Akinyemi
(74) *Attorney, Agent, or Firm* — McClure, Qualey & Rodack, LLP

(57) ABSTRACT

A communication device including a ground element and an antenna element is provided. The antenna element includes a metal element and a circuit element assembly. The metal element is adjacent to an edge of the ground element and does not overlap with the ground element. The circuit element assembly includes a first circuit and a second circuit, and is substantially surrounded by the metal element and the edge of the ground element. The first circuit includes a switch element, and the second circuit is a reactance circuit. The metal element is coupled through the first circuit to a first signal source. The metal element is further coupled through the second circuit to a second signal source.

18 Claims, 5 Drawing Sheets

COMMUNICATION DEVICE AND ANTENNA ELEMENT THEREIN

CROSS REFERENCE TO RELATED APPLICATIONS

This Application claims priority of Taiwan Patent Application No. 102148374 filed on Dec. 26, 2013, the entirety of which is incorporated by reference herein.

BACKGROUND OF THE INVENTION

1. Field of the Invention

The disclosure generally relates to a communication device, and more particularly to a communication device and a dual-wideband small-size antenna element therein.

2. Description of the Related Art

With rapid development of wireless communication technologies, people not only use mobile communication devices for talk, but also require them to provide more functions. The available space in a mobile communication device for the embedded antennas becomes very limited because a variety of modules and components should be disposed therein to support more functions. Accordingly, it is a critical challenge for antenna designers to design a small-size, dual-wideband antenna in a mobile communication device for covering main mobile communication bands.

BRIEF SUMMARY OF THE INVENTION

To overcome the problems in the prior art, the invention provides a new communication device, and an antenna element in the communication device has the advantages of simple structure and small size. The antenna element with a circuit element assembly can easily cover at least two wide frequency bands without occupying much design space. For example, the antenna element can support dual-wideband operations of the mobile communication device in a low-frequency band (e.g., from about 704 MHz to about 960 MHz) and a high-frequency band (e.g., from about 1710 MHz to about 2690 MHz).

In a preferred embodiment, the invention is directed to a communication device, comprising: a ground element; and an antenna element, comprising a metal element and a circuit element assembly, wherein the metal element is disposed adjacent to an edge of the ground element, the metal element does not overlap with the ground element, and the circuit element assembly is substantially surrounded by the metal element and the edge of the ground element; wherein the circuit element assembly comprises a first circuit and a second circuit, the first circuit comprises a switch element, the second circuit is a reactance circuit, the metal element is coupled through the first circuit to a first signal source, and the metal element is further coupled through the second circuit to a second signal source.

In some embodiments, the metal element and the circuit element assembly are formed or integrated on the same dielectric substrate. As a result, the metal element and the circuit element assembly do not occupy additional design space on the ground element or a system circuit board. The antenna element with a small-size structure (e.g., the total area of the antenna element may be just 150 $mm^2$) can support dual-wideband operations. For example, the antenna element can cover the LTE700/GSM850/900 of low mobile communication frequency bands (from about 704 MHz to about 960 MHz), and the GSM1800/1900/UMTS/LTE2300/2500 of high mobile communication frequency bands (from about 1710 MHz to about 2690 MHz).

In some embodiments, when the switch element is closed, the metal element is fed from the first signal source through the first circuit and is excited to generate a first frequency band. In some embodiments, when the switch element is open, the metal element is fed from the second signal source through the second circuit and is excited to generate a second frequency band, and the second frequency band is lower than the first frequency band. In some embodiments, the first frequency band is substantially from 1710 MHz to 2690 MHz, and the second frequency band is substantially from 704 MHz to 960 MHz. In some embodiments, the second circuit comprises at least an inductive element and a matching circuit. The inductive element is coupled in series to the matching circuit, and the inductive element is further coupled to the metal element. Since the inductive element provides an additional inductance, the small-size metal element (e.g., the resonant length of the metal element may be much smaller than ¼ wavelength (λ/4) or ⅛ wavelength (λ/8) of its lowest operation frequency) can be excited to generate a resonant mode in the lower (second) frequency band. When the switch element is open, a ground plane antenna element may be formed by the metal element and the ground element, and it can achieve lowerwideband operations using the matching circuit of the second circuit. In some embodiments, the matching circuit comprises a band-pass matching circuit.

On the other hand, when the antenna element operates in the higher (first) frequency band (i.e., the switch element is closed), the inductive element has high impedance, and therefore the second circuit is nearly open for the high-frequency feeding signal of the first signal source. As a result, the metal element can simply be fed from the first signal source through the first circuit, without being affected by the second circuit and the second signal source.

In some embodiments, the metal element substantially has an inverted L-shape, and the circuit element assembly is substantially disposed inside a region which is surrounded by the metal element and the edge of the ground element. In some embodiments, the first circuit and the second circuit are coupled to the same feeding point on the metal element. In some embodiments, the first circuit and the second circuit are respectively coupled to two different feeding points on the metal element. By integrating the metal element with the circuit element assembly, the antenna element of the invention can easily be designed to have a small size, and it is suitable for application in a variety of thin mobile communication devices.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing purposes, features and advantages of the invention, the embodiments and figures of the invention will be described in detail as follows.

Figure 1:
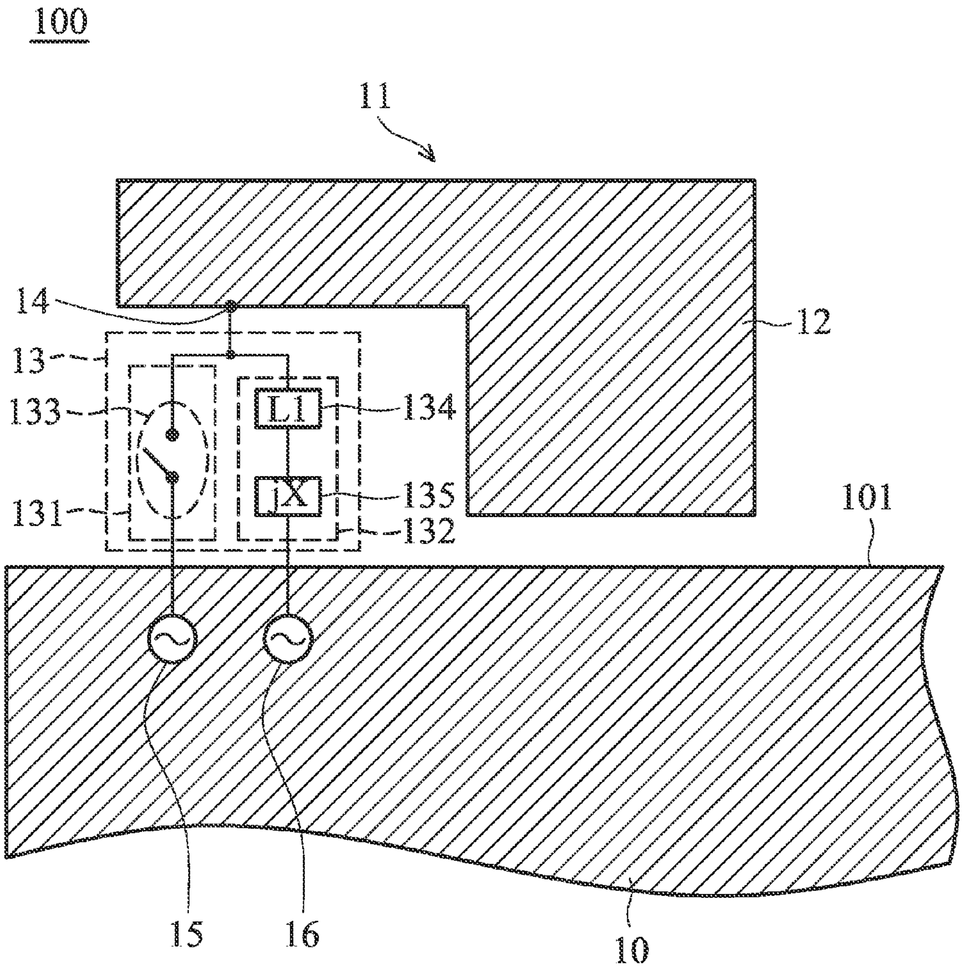
FIG. 1 is a diagram illustrating a communication device according to a first embodiment of the invention.

FIG. 1 is a diagram illustrating a communication device 100 according to a first embodiment of the invention. The communication device 100 may be a smartphone, a tablet computer, or a notebook computer. As shown in FIG. 1, the communication device 100 at least comprises a ground element 10 and an antenna element 11. The antenna element 11 comprises a metal element 12 and a circuit element assembly 13. The metal element 12 and the circuit element assembly 13 may be formed or integrated on the same dielectric substrate, such as an FR4 (Flame Retardant 4) substrate. The metal element 12 is disposed adjacent to an edge 101 of the ground element 10. The metal element 12 does not overlap with the ground element 10. The metal element 12 may substantially have an inverted L-shape. The circuit element assembly 13 may be substantially disposed inside a region which is surrounded by the metal element 12 and the edge 101 of the ground element 10, or may be substantially disposed in a corner notch of the inverted L-shaped metal element 12. The circuit element assembly 13 comprises a first circuit 131 and a second circuit 132. More particularly, the first circuit 131 comprises a switch element 133, and the second circuit 132 is a reactance circuit. The switch element 133 may be implemented with a transmission gate or a transistor, and it may be controlled by a processor (not shown) according to a user input or according to a control signal. The second circuit 132 may comprise at least an inductive element 134 and a matching circuit 135. The inductive element 134 may be coupled in series to the matching circuit 135, and the inductive element 134 may be further directly coupled to the metal element 12. The inductive element 134 may be a distributed inductor which is formed on a dielectric substrate. The matching circuit 135 may comprise one or more inductors and/or capacitors, such as chip inductors and/or chip capacitors. A feeding point 14 on the metal element 12 is coupled through the first circuit 131 to a first signal source 15, and the feeding point 14 on the metal element 12 is further coupled through the second circuit 132 to a second signal source 16. The first signal source 15 and the second signal source 16 may be two different RF (Radio Frequency) modules which are configured to generate a high-frequency feeding signal and a low-frequency feeding signal for exciting the antenna element 11, respectively. When the switch element 133 is closed, the metal element 12 may be fed from the first signal source 15 through the first circuit 131 and may be excited to generate a high-frequency band. When the switch element 133 is open, the metal element 12 may be fed from the second signal source 16 through the second circuit 132 and may be excited to generate a low-frequency band. Note that, besides the above components, the communication device 100 may further comprise other functional components, such as a touch panel, a processor, a speaker, a battery, and a housing (not shown).

Figure 2:
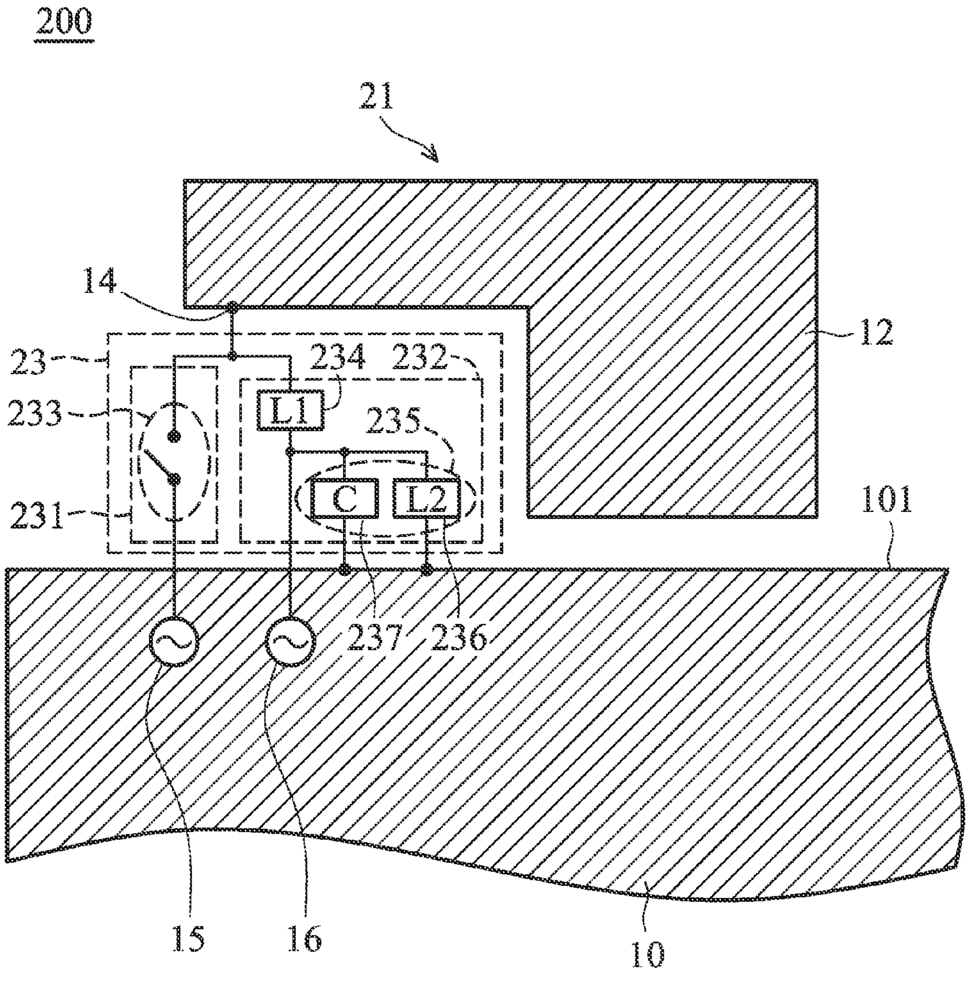
FIG. 2 is a diagram illustrating a communication device according to a second embodiment of the invention.

FIG. 2 is a diagram illustrating a communication device 200 according to a second embodiment of the invention. FIG. 2 is basically similar to FIG. 1. The main difference between the two embodiments is that, in an antenna element 21 of the communication device 200, a matching circuit 235 of a second circuit 232 of a circuit element assembly 23 comprises a band-pass matching circuit. More particularly, the band-pass matching circuit may comprise at least an inductive element 236 and at least a capacitive element 237 (e.g., a chip inductor and a chip capacitor). The inductive element 236 and the capacitive element 237 may be coupled in parallel between an inductive element 234 of the second circuit 232 and the edge 101 of the ground element 10. This design can further increase the operation bandwidth of the antenna element 21. Other features of the communication device 200 of FIG. 2 are similar to those of the communication device 100 of FIG. 1. Accordingly, the two embodiments can achieve similar levels of performance.

Figure 3:
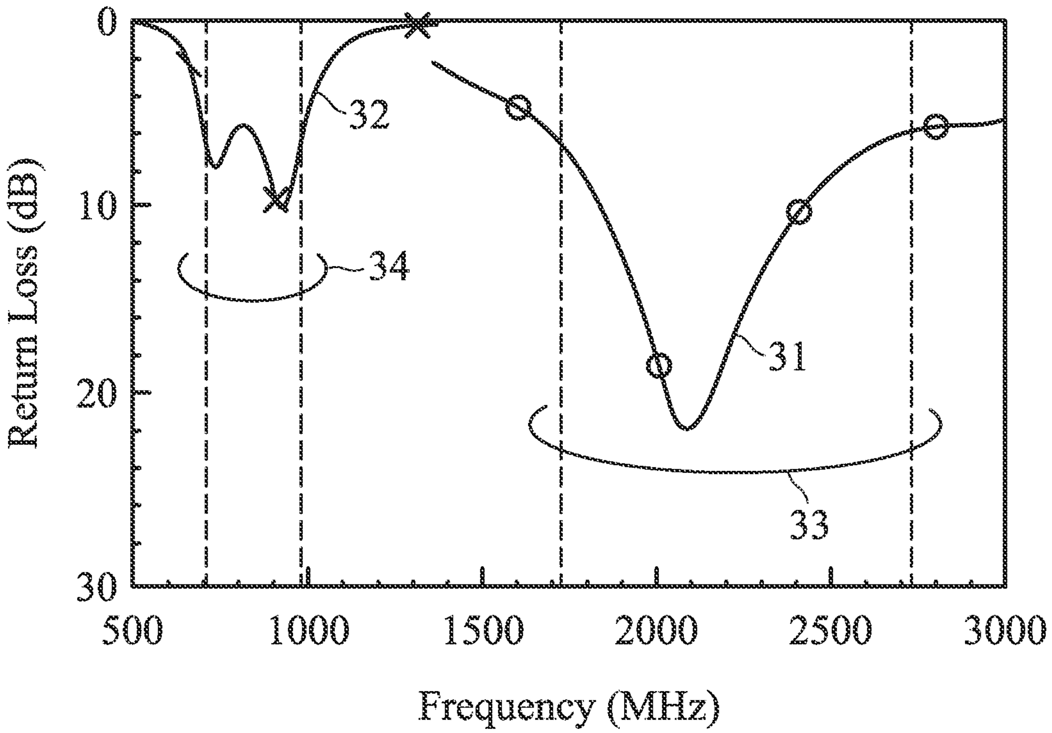
FIG. 3 is a diagram illustrating return loss of an antenna element of a communication device according to a second embodiment of the invention.

FIG. 3 is a diagram illustrating return loss of the antenna element 21 of the communication device 200 according to the second embodiment of the invention. In some embodiments, the element sizes and element parameters of the communication device 200 are described as follows. The antenna element 21 (including the metal element 12 and the circuit element assembly 23) has a length of about 15 mm and a width of about 10 mm. The ground element 10 has a length of about 200 mm and a width of about 150 mm. The size of the ground element 10 is substantially consistent with a ground plane size of a typical 10" tablet computer. The inductive element 234 of the second circuit 232 is a distributed inductor which is formed on a dielectric substrate. The distributed inductor has a length of about 2 mm and a width of about 4 mm. The distributed inductor has an inductance of about 35 nH. The inductive element 236 of the matching circuit 235 has an inductance of about 7.5 nH. The capacitive element 237 of the matching circuit 235 has a capacitance of about 2.5 pF. According to the return-loss result of FIG. 3, when a switch element 233 is closed and the antenna element 21 is fed from the first signal source 15, the antenna element 21 can cover a first frequency band 33 (as shown as the return loss curve 31) which comprises at least the GSM1800/1900/UMTS/LTE2300/2500 frequency bands (from about 1710 MHz to about 2690 MHz), and when the switch element 233 is open and the antenna element 21 is fed from the second signal source 16, the antenna element 21 can cover a second frequency band 34 (as shown as the return loss curve 32) which comprises at least the LTE700/GSM850/900 frequency bands (from about 704 MHz to about 960 MHz). Therefore, the antenna element 21 with a small-size structure can support dual-wideband operations of mobile communication.

Figure 4:
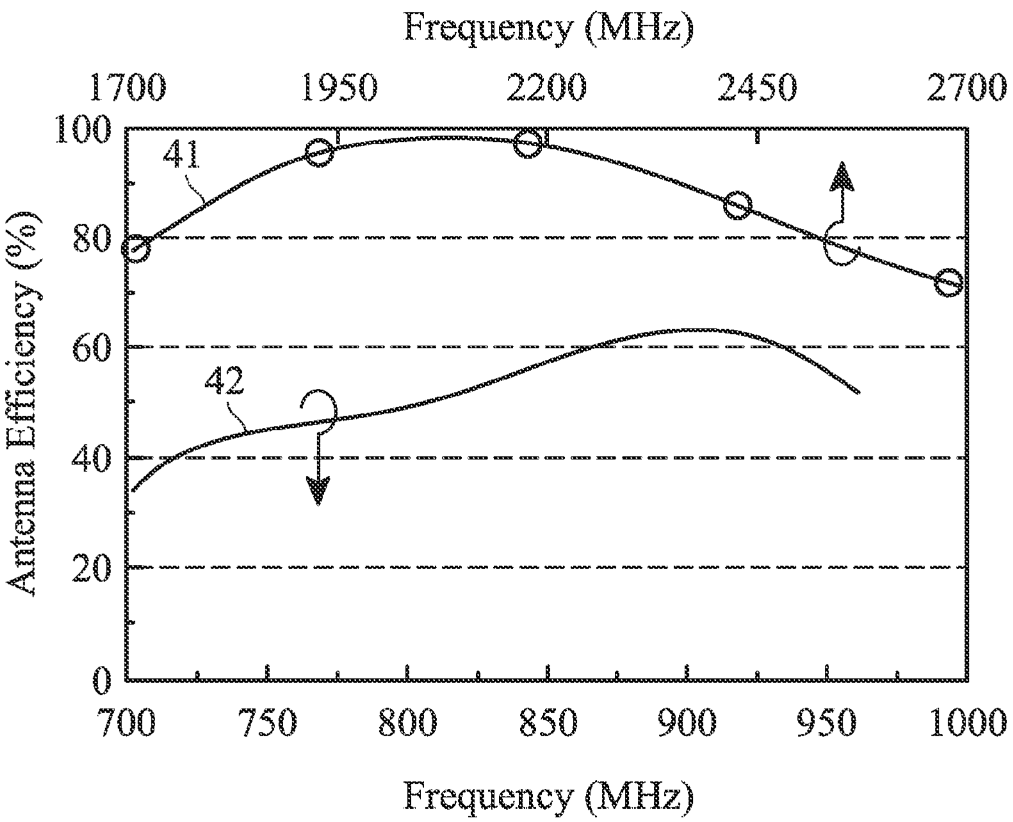
FIG. 4 is a diagram illustrating antenna efficiency of an antenna element of a communication device according to a second embodiment of the invention.

FIG. 4 is a diagram illustrating antenna efficiency of the antenna element 21 of the communication device 200 according to the second embodiment of the invention. It is understood that the aforementioned antenna efficiency is the radiation efficiency including the return loss. According to the measurement result of FIG. 4, when the antenna element 21 is excited by the first signal source 15, the antenna efficiency of the antenna element 21 is higher than 70% in the first frequency band 33 (as shown as the antenna efficiency curve 41), and when the antenna element 21 is excited by the second signal source 16, the antenna efficiency of the antenna element 21 is from about 35% to about 63% in the second frequency band 34 (as shown as the antenna efficiency curve 42, in which the 35% antenna efficiency appears at about 700 MHz). Therefore, the antenna efficiency of the antenna element 21 can meet the requirements of practical applications of mobile communication devices.

Figure 5:
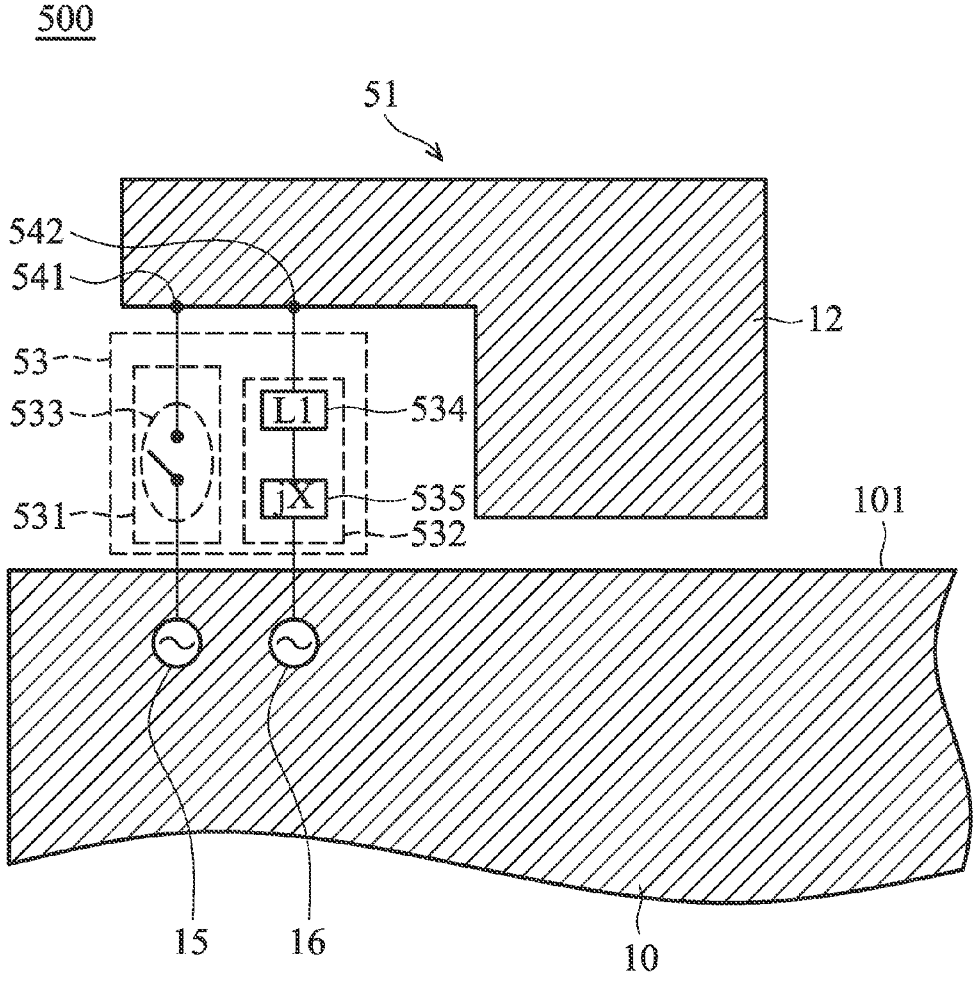
FIG. 5 is a diagram illustrating a communication device according to a third embodiment of the invention.

FIG. 5 is a diagram illustrating a communication device 300 according to a third embodiment of the invention. FIG. 5 is basically similar to FIG. 1. The main difference between the two embodiments is that, in an antenna element 51 of the communication device 500, a first circuit 531 and a second circuit 532 of a circuit element assembly 53 are respectively coupled to two different feeding points 541 and 542 on the metal element 12. Other features of the communication device 500 of FIG. 5 are similar to those of the communication device 100 of FIG. 1. Accordingly, the two embodiments can achieve similar levels of performance.

Note that the above element sizes, element shapes, element parameters, and frequency ranges are not limitations of the invention. An antenna designer can fine tune these settings or values according to different requirements. It is understood that the communication device and the antenna element of the invention are not limited to the configurations of FIGS. 1-5. The invention may merely include any one or more features of any one or more embodiments of FIGS. 1-5. In other words, not all of the features displayed in the figures should be implemented in the communication device and the antenna element of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:

a ground element; and an antenna element, comprising a metal element and a circuit element assembly, wherein the metal element is disposed adjacent to an edge of the ground element, the metal element does not overlap with the ground element, and the circuit element assembly is substantially surrounded by the metal element and the edge of the ground element;

wherein the circuit element assembly comprises a first circuit and a second circuit, the first circuit comprises a switch element, the second circuit is a reactance circuit, the metal element is coupled through the first circuit to a first signal source, and the metal element is further coupled through the second circuit to a second signal source;

wherein the metal element substantially has an inverted L-shape, and the circuit element assembly is substantially disposed inside a region which is surrounded by the metal element and the edge of the ground element.

2. The communication device as claimed in claim 1, wherein when the switch element is closed, the metal element is fed from the first signal source through the first circuit and is excited to generate a first frequency band.

3. The communication device as claimed in claim 2, wherein when the switch element is open, the metal element is fed from the second signal source through the second circuit and is excited to generate a second frequency band, and wherein the second frequency band is lower than the first frequency band.

4. The communication device as claimed in claim 3, wherein the first frequency band is substantially from 1710 MHz to 2690 MHz, and the second frequency band is substantially from 704 MHz to 960 MHz.

5. The communication device as claimed in claim 1, wherein the second circuit comprises at least an inductive element and a matching circuit, the inductive element is coupled in series to the matching circuit, and the inductive element is further coupled to the metal element.

6. The communication device as claimed in claim 5, wherein the matching circuit comprises a band-pass matching circuit.

7. The communication device as claimed in claim 1, wherein the metal element and the circuit element assembly are formed or integrated on a same dielectric substrate.

8. The communication device as claimed in claim 1, wherein the first circuit and the second circuit are coupled to a same feeding point on the metal element.

9. The communication device as claimed in claim 1, wherein the first circuit and the second circuit are respectively coupled to two different feeding points on the metal element.

10. A communication device, comprising:

a ground element; and an antenna element, comprising a metal element and a circuit element assembly, wherein the metal element is disposed adjacent to an edge of the ground element, the metal element does not overlap with the ground element, and the circuit element assembly is substantially surrounded by the metal element and the edge of the ground element;

wherein the circuit element assembly comprises a first circuit and a second circuit, the first circuit comprises a switch element, the second circuit is a reactance circuit, the metal element is coupled through the first circuit to a first signal source, and the metal element is further coupled through the second circuit to a second signal source;

wherein the second circuit comprises at least an inductive element and a matching circuit, the inductive element is coupled in series to the matching circuit, and are inductive element is further coupled to the metal element.

11. The communication device as claimed in claim 10, wherein when the switch element is closed, the metal element is fed from the first signal source through the first circuit and is excited to generate a first frequency band.

12. The communication device as claimed in claim 11, wherein when the switch element is open, the metal element is fed from the second signal source through the second circuit and is excited to generate a second frequency band, and wherein the second frequency band is lower than the first frequency band.

13. The communication device as claimed in claim 12, wherein the first frequency band is substantially from 1710 MHz to 2690 MHz, and the second frequency band is substantially from 704 MHz to 960 MHz.

14. The communication device as claimed in claim 10, wherein the matching circuit comprises a band-pass matching circuit.

15. The communication device as claimed in claim 10, wherein the metal element substantially has an inverted L-shape, and the circuit element assembly is substantially disposed inside a region which is surrounded by the metal element and the edge of the ground element.

16. The communication device as claimed in claim 10, wherein the metal element and the circuit element assembly are formed or integrated on a same dielectric substrate.

17. The communication device as claimed in claim 10, wherein the first circuit and the second circuit are coupled to a same feeding point on the metal element.

18. The communication device as claimed in claim 10, wherein the first circuit and the second circuit are respectively coupled to two different feeding points on the metal element.

* * * * *